R. Z. FARMER AND G. S. MARSH.
CAR BRAKE.
APPLICATION FILED NOV. 8, 1919.
1,416,181.
Patented May 16, 1922.
2 SHEETS—SHEET 2.
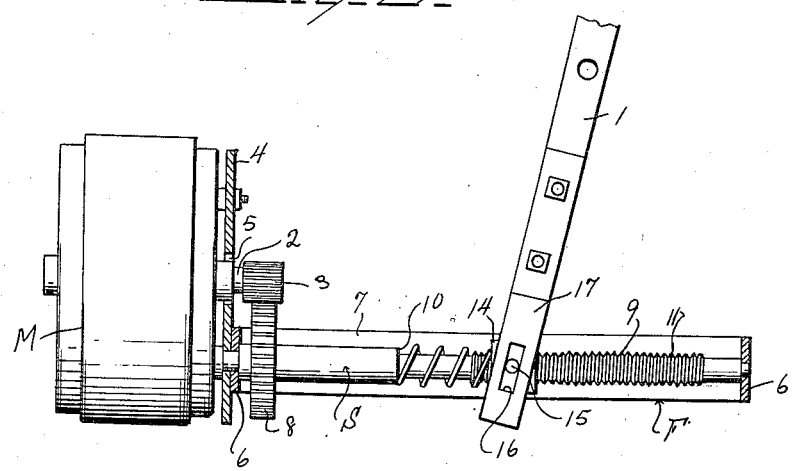
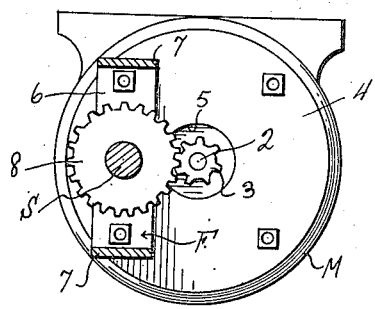
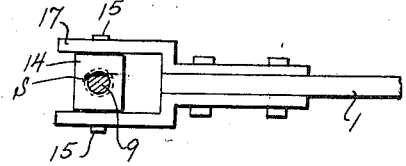
Inventors
R. Z. Farmer and
G. S. Marsh
By Watson E. Coleman
Attorney

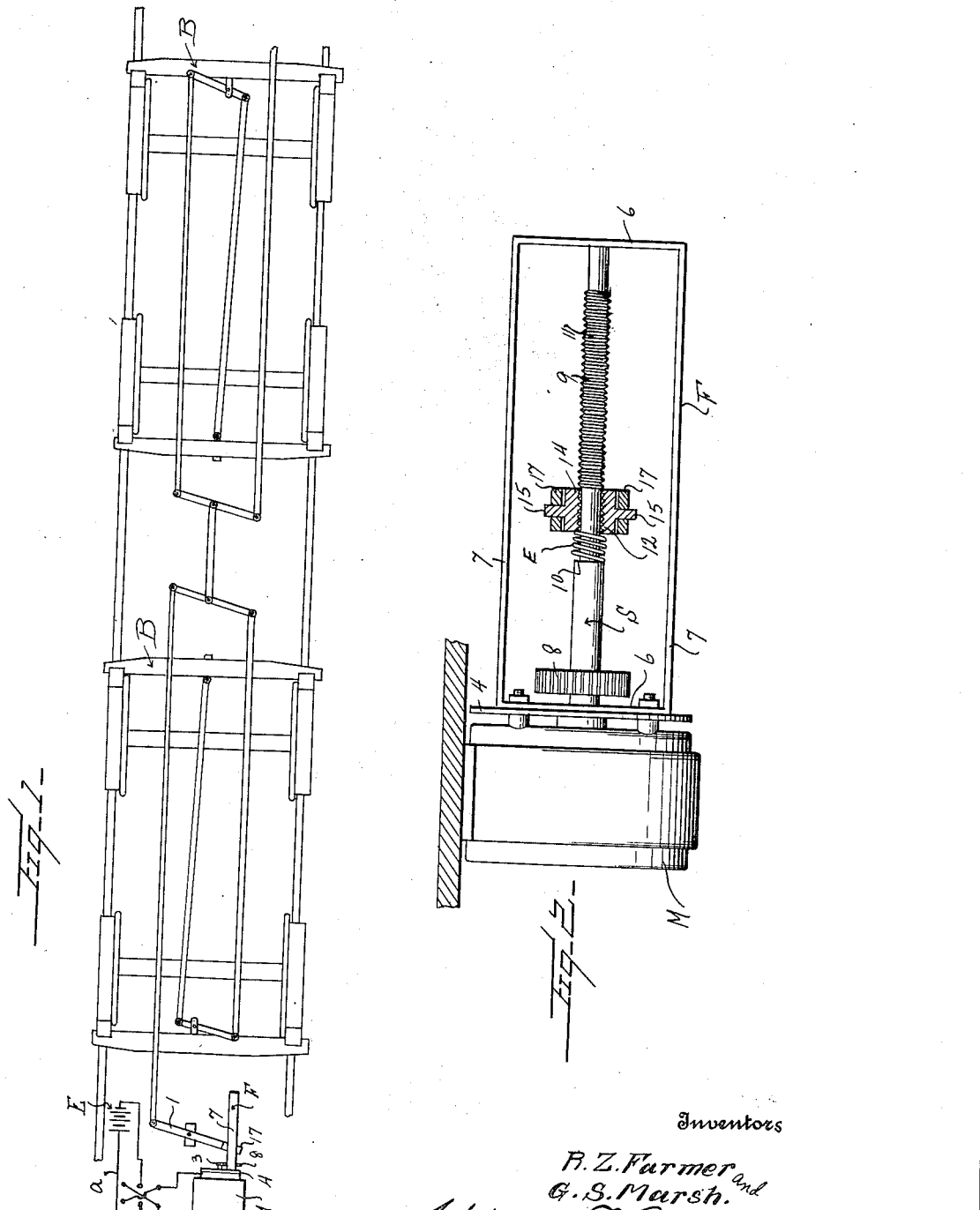

UNITED STATES PATENT OFFICE.

ROBERT Z. FARMER AND GEORGE S. MARSH, OF ROSEBURG, OREGON, ASSIGNOR TO AUTOMATIC ELECTRIC BRAKE COMPANY, A CORPORATION OF OREGON.

CAR BRAKE.

1,416,181.              Specification of Letters Patent.      Patented May 16, 1922.

Application filed November 8, 1919. Serial No. 336,764.

*To all whom it may concern:*

Be it known that we, ROBERT Z. FARMER and GEORGE S. MARSH, citizens of the United States, residing at Roseburg, in the county of Douglas and State of Oregon, have invented certain new and useful Improvements in Car Brakes, of which the following is a specification, reference being had to the accompanying drawings.

This invention relates to certain improvements in car brakes, and it is an object of the invention to provide a novel and improved means whereby the brake may be adjusted into either set or released position through the instrumentality of a motor, preferably electric.

It is also an object of the invention to provide novel and improved means for operating a brake including a driven shaft threaded through a non-rotatable body and which body is supported for endwise movement upon rotation of the shaft and operatively connected with the brake to impart the requisite adjustments or movements thereto, and preferably through the medium of the brake lever now generally employed.

The invention consists in the details of construction and in the combination and arrangement of the several parts of our improved car brake whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a diagrammatic view illustrating a car brake arranged in accordance with an embodiment of our invention.

Figure 2 is an enlarged fragmentary view, partly in section and partly in elevation, illustrating the means herein embodied for imparting requisite movement to the brake lever.

Figure 3 is a view, partly in bottom plan and partly in section, of the construction shown in Figure 2.

Figure 4 is a view, partly in front elevation and partly in section, of the structure shown in Figure 2, and, Figure 5 is an enlarged fragmentary view, partly in elevation and partly in section, illustrating the connection between the movable block and the brake lever.

As disclosed in the accompanying drawings, B denotes a brake rigging herein disclosed as of a conventional type, and which includes a brake lever 1 with which the operating motor M coacts.

As herein disclosed, the motor M is electrical and of a well known type and the motor is electrically connected with a suitable source E of electrical energy through the medium of the conductors a and in which is interposed a reversing switch R of any desired type so that the direction of rotation of the motor M may be in accordance with the requirements of practice.

The motor M is suitably supported below the floor of a car and is preferably suspended therefrom and the armature or driving shaft 2 thereof extends exteriorly of the casing of the motor and secured to said extended portion is a pinion 3, whereby driving connection is had with the shaft S, to be hereinafter more particularly referred to.

Secured to a face of the casing of the motor M is a plate 4 provided in its central portion with an opening 5 through which is directed the extended portion of the armature or driving shaft 2. Suitably secured to the plate 4 at one side of the opening 5 is an end member 6 of an elongated frame F preferably oblong in form with its side members 7 substantially vertically aligned when the motor is in working position.

The shaft S, hereinbefore referred to, is arranged within the frame F and rotatably supported by the end members 6 thereof. The inner end portion of the shaft S has fixed thereto a gear 8 meshing with the pinion 3 whereby the requisite driving connection is had with the shaft S.

The forward end portion of the shaft S is reduced in diameter, as indicated at 9, and said reduced portion 9 extends along the major portion of the shaft S with a shoulder 10 at the inner end of said reduced portion 9 for a purpose later to be referred to.

The periphery of the reduced portion is provided with the thread 11 engageable with the threaded bore 12, of a block 14, whereby said block 14 is caused to move longitudinally of the shaft S upon rotation of said shaft, and in a direction dependent upon the direction of rotation of said shaft. However the periphery of the shaft 9 adjacent the shoulder 10 is smooth and unobstructed, so that when the block 14 is held against movement by the shoulder 10, the block 14 is free of the threads 11.

When the block 14 is substantially in contact with the shoulder 10, it places under compression or tension an expansible member E, herein disclosed as a coil spring interposed between the block 14 and the shoulder 10, whereby the block 14 is automatically urged in a direction toward the threads 11 and for engagement therewith when the shaft 11 is rotated in the requisite direction. By this means when the brake is in full release, the block 14 does not jam, as it is released from the threads 11, and the shaft S rotates freely. When the motor M or the shaft S is reversed, the block 14 immediately starts to travel outwardly on the threads 11.

Opposite faces of the block 14 are provided with outstanding trunnions 15, extending within the elongated openings 16 provided in the extremities of a fork 17 straddling the block 14. The fork 17 is carried by the lever 1 hereinbefore referred to. In view of this, it will be obvious that upon movement of the block 14 in one direction, the brakes will be set and upon movement in the opposite direction the brakes will be released.

We also wish to state that we do not wish to be limited to the particular type of brake rigging disclosed in the accompanying drawings as our invention can be readily applied to the various types now generally employed in connection with railway cars.

The shoulder 10 operates to limit the movement of the block 14 inwardly of the shaft S and which movement, in the present embodiment of our invention, results in throwing the brakes into release.

It is our purpose that each car or unit of rolling stock be provided with a separate operating means for the brake rigging with the controlling switch R arranged in the locomotive for operation by the engineer or motorman. The conductors for the motors of the remaining cars are adapted to be connected in a conventional manner upon coupling of the car in a train so that the motors of all of the cars in a train may be operated in unison.

In practice, when a train has been coupled, the motor is caused to rotate the shaft in a direction whereby it is assured that all of the blocks 14 will be brought into contact with the stops 10, whereby it is assured that all of the brakes are in release, and which also assures the corresponding operation of all of the brakes thereafter. It is also to be understood that when the brakes are in release, the switch R is in neutral.

The outer or opposite extremity of portion 9 of the shaft S also has its periphery smooth and unobstructed, and for a distance substantially equal to the length of the block 14, so that in the event the rigging should break, pull in two or from other cause, the block 14 will travel to the outer end of said portion 9 of the shaft S, and said outer free or unobstructed periphery will permit the shaft S to turn independently of the block 14, so that jamming of the block 14 at the outer portion of the shaft S is prevented.

From the foregoing description, it is thought to be obvious that a car brake constructed in accordance with our invention is particularly well adapted for use by reason of the convenience and facility with which it may be assembled or operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In combination with a brake lever of a brake rigging, a shaft, a member threaded on said shaft and in pivotal connection with the brake lever, means for rotating the shaft in either direction for imposing push or pull upon the brake lever, and expansible means for limiting the movement of the member in one direction, said shaft rotating independently of the member when the member is at the limit of its movement as controlled by the expansible means.

2. The combination with a brake lever of a brake rigging, a driving shaft, and means for reversely rotating said shaft, of a frame, a shaft supported by said frame and in driving connection with the driving shaft, a block threaded upon said second shaft and movable longitudinally thereof in opposite directions, said brake lever being pivotally engaged with the block, and expansible means for limiting the movement of the block in one direction, said second shaft rotating independently of the block when the block is at the limit of its movement as controlled by the expansible means.

3. The combination with a brake lever of a brake rigging, a driving shaft, and means for reversely rotating said shaft, of a frame, a shaft supported by said frame and in driving connection with the driving shaft, a block threaded upon said second shaft and movable longitudinally thereof in opposite directions, said brake lever being pivotally engaged with the block, said second shaft being provided with a shoulder, and an expansible member interposed between the shoulder and block for limiting the movement of the block along the shaft in one direction, said second named shaft rotating independently of the block when the block is at the limit of its movement as controlled by the expansible member.

4. In combination with a brake lever of a brake rigging, a shaft, a member threaded on said shaft and operatively connected with the brake lever, means for rotating the shaft in either direction for imposing push or pull upon the brake lever, said shaft rotating independently of the member when the member is at the limit of its movement in one direction, and means placed under tension by the member when in said last named position for urging the member in a direction to engage the shaft.

5. In combination with a brake lever of a rigging, a shaft, a member threaded on said shaft and operatively connected with the brake lever, means for rotating the shaft in either direction for imposing push or pull upon the brake lever, said shaft rotating independently of the member when the member is at the limit of its movement in either direction, and means placed under tension by the member when in one of said last named positions for urging the member in a direction to engage the shaft.

In testimony whereof we hereunto affix our signatures.

ROBERT Z. FARMER.
GEORGE S. MARSH.